United States Patent
Smith et al.

(10) Patent No.: US 7,113,749 B2
(45) Date of Patent: Sep. 26, 2006

(54) SYSTEM AND METHOD FOR MEASURING A HIGH SPEED SIGNAL

(75) Inventors: Thomas J. Smith, Charlotte, VT (US); Michael A. Sorna, Hopewell Junction, NY (US); John F. Sweeney, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 10/604,419

(22) Filed: Jul. 18, 2003

(65) Prior Publication Data

US 2005/0013355 A1    Jan. 20, 2005

(51) Int. Cl.
  *H04B 17/00*  (2006.01)
  *G01R 31/28*  (2006.01)
  *H04M 1/00*  (2006.01)

(52) U.S. Cl. .................. 455/67.11; 455/423; 455/115.1; 455/115.3; 455/226.1; 455/226.2; 714/724; 714/731; 375/224; 375/225; 341/126; 341/155; 370/241; 370/252

(58) Field of Classification Search ................ 455/423, 455/424, 425, 67.11, 115.1, 115.3, 115.4, 455/226.1–226.4; 714/724, 731, 732, 742, 714/744, 745; 341/126, 131–155; 375/224–228; 370/241–252

See application file for complete search history.

(56) References Cited

U.S. PATENT DOCUMENTS

| | | | | |
|---|---|---|---|---|
| 4,371,850 | A | * | 2/1983 | Klement ..................... 341/143 |
| 4,710,927 | A | | 12/1987 | Miller ........................ 714/724 |
| 2004/0027993 | A1 | * | 2/2004 | Ghiasi et al. ............... 370/249 |
| 2004/0135231 | A1 | * | 7/2004 | Keller et al. ................ 257/620 |
| 2004/0161070 | A1 | * | 8/2004 | Yin et al. ................... 375/371 |

* cited by examiner

*Primary Examiner*—Duc M. Nguyen
(74) *Attorney, Agent, or Firm*—Daryl K. Neff; H. Daniel Schnurmann

(57) ABSTRACT

An apparatus is provided for measuring an output of a high-speed data transmission circuit. The apparatus includes a programmable reference voltage generator operable to generate a reference voltage that is variable between a plurality of levels. The apparatus also includes a quantizer to quantize an output of the high-speed data transmission circuit relative to the reference voltage level input thereto. Also included is a clock generator operable to generate a clock having a transitioning time (rise-time, fall-time or both) that is less than one quarter of a minimum switching period of the output of the circuit. Finally, the apparatus includes a sampler operable to sample the quantized output with the clock to produce a plurality of samples which measure the output of the circuit.

19 Claims, 3 Drawing Sheets

SYSTEM AND METHOD FOR MEASURING A HIGH SPEED SIGNAL

BACKGROUND OF INVENTION

The invention relates generally to the measurement of an electronically transmitted signal, and more particularly to a system and method for measuring a high-speed signal, such as a signal of an integrated circuit.

After an integrated circuit ("IC", or "chip") has been designed and fabricated, it is tested to determine whether the chip functions as intended. As the level of integration of chips has increased, however, the difficulty of testing them has also increased.

A number of methods are used to test the operation of chips after fabrication, but many of them are ineffective to test parameters of high-speed operation. For example, in frequently used methods, a fixture having a socket outfitted with probes contacts the bond pads of a chip or a chip module. A set of signal lines connect the socket of the fixture to test equipment. When the chip or module is so connected to test equipment, basic functional operation of the chip is then verified in a sequence of tests usually lasting only seconds.

The above method is sufficient for testing many types of chips, including digital chips having outputs at speeds that match internal bus speeds of processing equipment, and analog chips having outputs at frequencies of about 300 MHz or less. However, the testing of a high-speed serial data transmitter presents challenges that cannot be satisfactorily addressed by the above method. In such testing method, the probes, socket, wiring, and printed circuit board between the chip and external test equipment have high inductance and parasitic capacitance, which limits the bandwidth of signals that can reach the test equipment. High-speed serial data transmitters produce outputs at gigahertz frequencies, some currently at 10 GHz and higher, far above the bandwidth of such fixtures and test equipment available for post-fabrication testing. Therefore, signal characteristics of the high-speed outputs cannot be measured using only the available post-fabrication test fixtures and test equipment.

Among the output signal characteristics of a serial data transmitter that are desired to be measured are rise-time, fall-time, and jitter, including the eye width and eye height of the output signal. The signal eye width represents the minimum time interval between signal transitions and the eye height represents the minimum voltage difference between high and low signal levels that is sustainable over relatively large numbers of signal cycles. Such measurements determine the quality of the transmitted output signal. An output signal having an eye width or eye height outside of tolerances can cause the bit error rate for receiving the transmitted output signal to exceed threshold.

It would be desirable to measure output signal characteristics of high-speed serial data transmitters when verifying operation of chips and modules after fabrication. However, since the output signals of such high-speed serial data transmitters are outside of the bandwidth of the available test fixtures and equipment, a new system and method are needed to measure the output signal characteristics.

SUMMARY OF INVENTION

According to an aspect of the invention, an apparatus is provided for measuring an output of a high-speed data transmission circuit. The apparatus includes a programmable reference voltage generator operable to generate a reference voltage that is variable between a plurality of levels. The apparatus also includes a quantizer to quantize an output of the high-speed data transmission circuit relative to the reference voltage level input thereto. Also included is a clock generator operable to generate a clock having a transitioning time (e.g. rise-time or fall-time or both) that is less than one quarter of a minimum switching period of the output of the circuit. The apparatus further includes a sampler operable to sample the quantized output with the clock to produce a plurality of samples that measure the output of the circuit.

DETAILED DESCRIPTION

Accordingly, an objective of the invention is to provide a system and method for measuring a high-speed signal which are compatible with existing types of production test fixtures and equipment, such that characteristics of the high-speed signal can be determined. When the invention is implemented on a chip including a high-speed serial data transmitter, the characteristics of the high-speed signal output by the chip can be measured and analyzed through an interface to a production test fixture and equipment.

The system of the invention is primarily intended to be implemented on the same chip that includes a high-speed serial data transmitter. The measurement system of the invention requires a high bandwidth, low loss environment that is often best obtained on the same chip on which the high-speed serial transmitter is located, due to bandwidth limitations and losses that occur external to the chip. In such way, characteristics of the high-speed signal can be measured on the chip, and the measurements then be provided as a slower speed signal output through a production test fixture to external test equipment.

Figure 1:
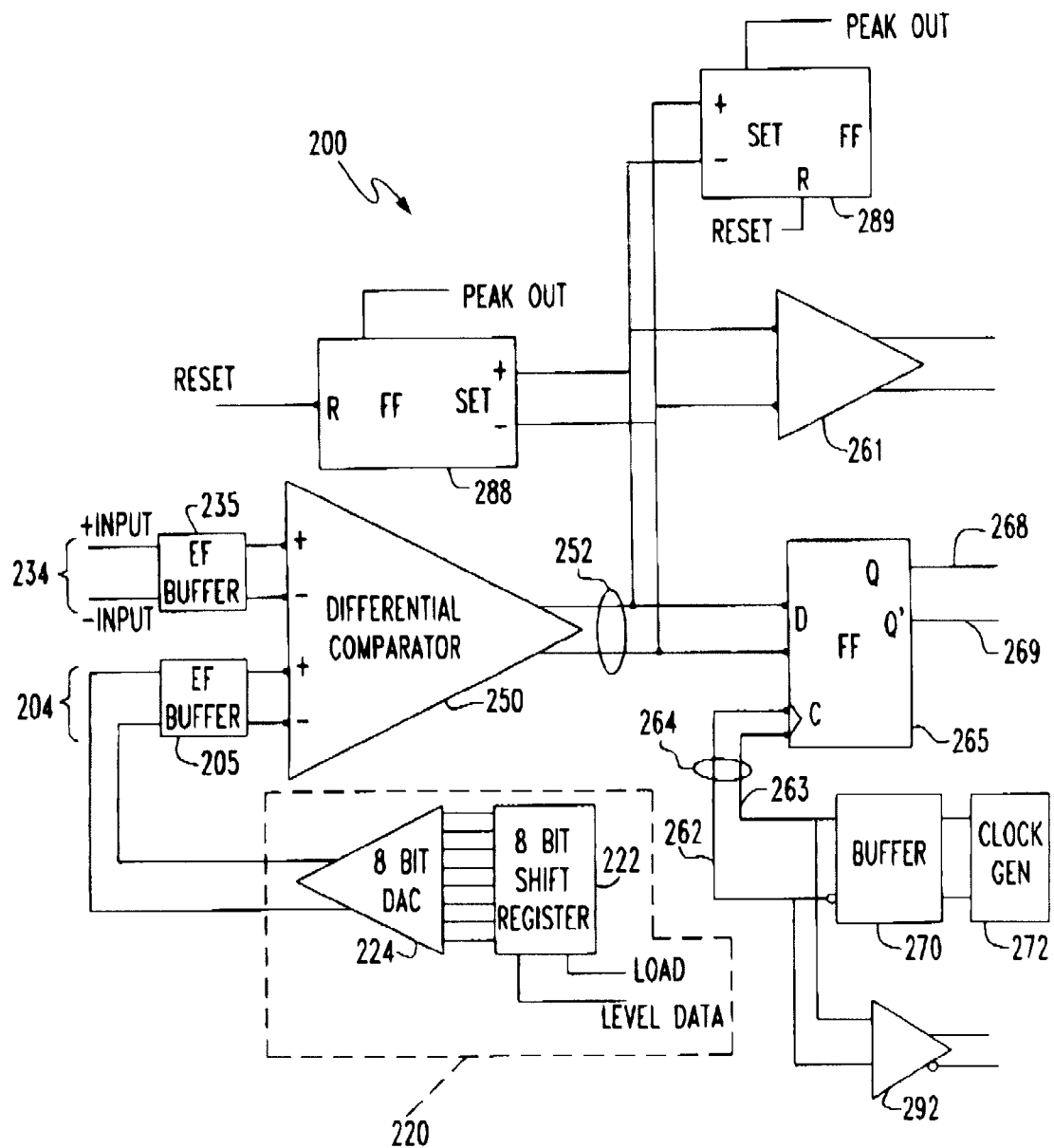
FIG. 1 is a block and schematic diagram illustrating an embodiment of the invention.

FIG. 1 illustrates an embodiment of the invention as a measurement circuit 200. As shown in FIG. 1, measurement circuit 200, preferably implemented on the same chip as the circuit which produces the signals to be measured thereby, includes a high speed differential comparator 250 for quantizing the output of a circuit under test (CUT) on that same chip. The input signal 234 to the comparator 250 is the output of the CUT, for example, a serial driver of a high-speed serial transmitter. The comparator 250 compares the voltage difference between the pair 234 of differential signals output from the CUT to the voltage difference between the pair 204 of differential reference voltage levels generated by a programmable reference voltage generator 220. The output of the comparator is a pair of differential signals 252 representing the quantized "1" or "0" result of the comparison. For example, at an instant in time when the plus and minus differential signals 234 output from the CUT have a value of 1.0 and 0.3 volts, respectively, the voltage difference between the CUT output signals is 0.7 volts. At the same instant in time, the differential outputs 204 of the reference voltage generator 220 can be 0.7 volts and 0.4 volts, respectively, such that its voltage difference is 0.3 volts. The differential comparator 250 compares the 0.7 V difference of the CUT signals to the 0.3 V difference of the reference voltage signals. Since the voltage difference of the CUT signals is larger, the comparator outputs a "1" on differential output lines 252.

Prior to inputting the differential CUT signals 234 and the differential reference voltage signals 204 to the comparator 250, the signals are buffered using emitter follower (EF) buffers 235 and 205, respectively, to avoid loading the sources of these signals, namely the CUT and the reference voltage generator 220. Source loading should be avoided as it can alter the characteristics of the signal to be measured by the circuit 200, blurring or delaying the transitions of the CUT signal. In other words, source loading introduces jitter into the measurement process.

Besides jitter, noise also affects signal reception. Voltage to time conversion of noise can distort the sample measurements of the input signal. Clean, well-bypassed reference voltages 204 are required to be input to the comparator 250 by reference voltage generator 220. Differential circuits utilizing differential inputs and outputs, as provided in the embodiments herein, have excellent common mode rejection, however, differential mode noise is amplified. Hence, it is desirable to minimize noise on the reference voltage levels 204 provided to comparator 250.

A multistage or wideband amplifier is preferred for use as the differential comparator 250. Multistage amplifiers generally include single transistor amplifiers connected in cascade. The first stage (transducer stage) provides a high input impedance to minimize loading the source. The middle stages (gain stages) usually account for most of the desired voltage gain. The final stage provides low output impedance to prevent loss of signal. In a cascade configuration, the voltage gain (AV) and current gain (AI) are given by: overall=AV first stage*AV second stage; overall=AI first stage*AI second stage In a preferred embodiment, the comparator 250 is implemented by a multistage Cherry-Hooper amplifier having a trans-admittance stage and trans-impedance stage (TAS/TIS). Such Cherry-Hooper amplifier utilizes resistive feedback from the output to the input of the amplifier to mitigate the Miller capacitance effect. That same resistor is also used to provide a termination resistance for terminating transmission lines at the input to the comparator from the buffer 235. Such Cherry-Hooper amplifier is particularly advantageous because it effectively minimizes pulse-width distortions.

The programmable reference voltage generator 220 includes a shift register 222 and a digital to analog converter (DAC) 224. A shift register 222 is provided such that only serial bit input need be provided as LEVEL DATA for controlling the output of the DAC. The LOAD input is provided for timing the loading of LEVEL DATA to the shift register 222. In the illustrative embodiment shown in FIG. 2, both the shift register 222 and the DAC 224 coupled thereto operate with 8-bit precision such that the reference voltage output of the DAC 224 can be varied between as many as 256 levels.

By providing appropriately programmed LEVEL DATA input to the shift register 222, the reference voltage outputs can be varied between many different levels. Thus, reference voltage levels can be varied between many different negative levels, for example, the differential voltage levels of −1.0, −0.6, −0.2, and many positive differential voltage levels, for example 0.2, 0.4, 0.6, 0.8, 1.0 and 1.2. As the eight bit width of the shift register allows up to 256 different voltage levels, as many as 128 different negative levels and 128 different positive levels symmetric thereto can be output from the DAC 224 to comparator 250 for quantizing the output signal of the circuit under test (CUT).

Figure 2:
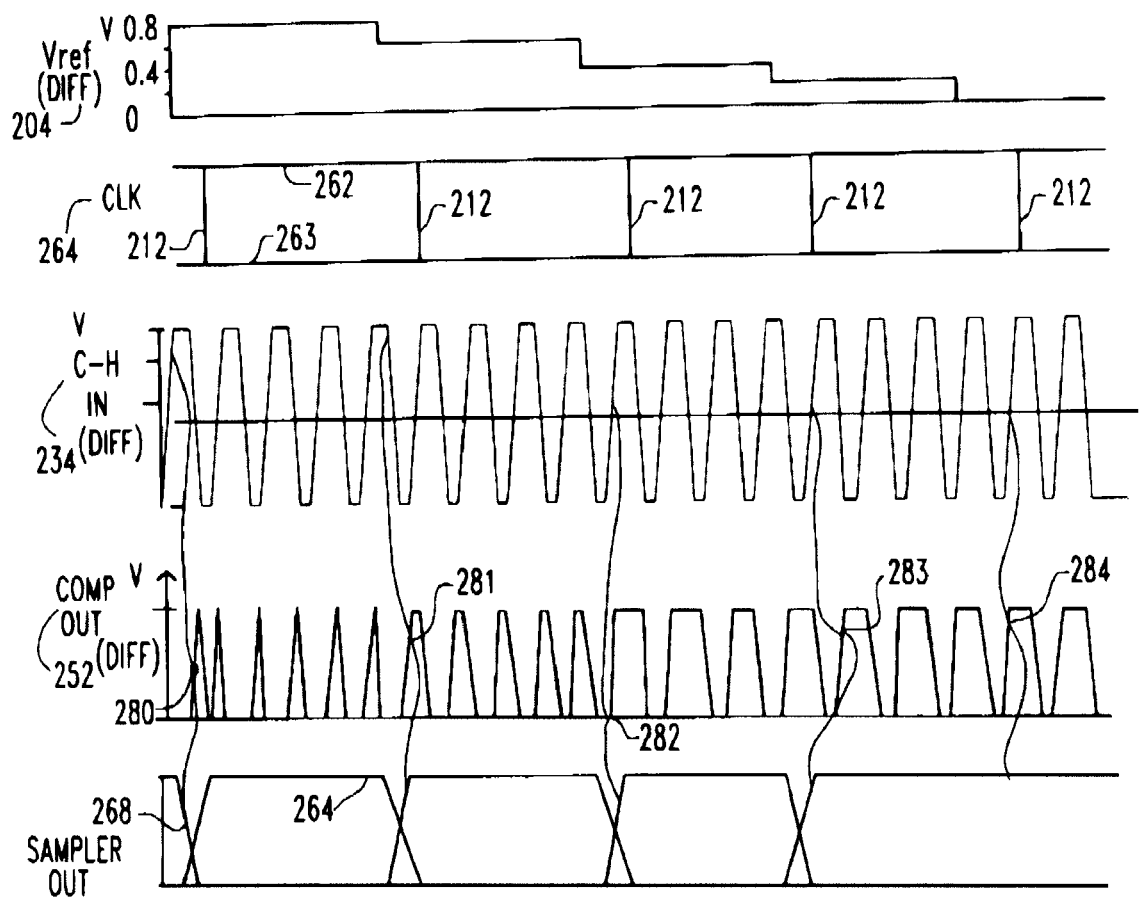
FIG. 2 is a timing diagram illustrating operating according to the invention.

A graph showing sample levels of the differential reference voltage Vref is shown in the graph labeled Vref in FIG. 2. The reference voltage generator 220 can be operated, by an appropriately programmed sequence of LEVEL DATA and LOAD inputs to the shift register 222, to produce a sequence of reference voltage levels according to a programmed test pattern. In the example of operation shown in FIG. 2, Vref is varied between 0.8 V and 0 V in increments of 0.2 Volts over many cycles. As described in more detail below, such programmed test patterns can be used together with appropriate sampling by a fast transitioning clock, to measure characteristics of the CUT output signal such as rise-time, fall-time, eye width and eye height.

The quantized output 252 of the differential comparator 250 is input to a sample and hold circuit, i.e., a "sampler" 265, preferably comprising a differential signal D-type flip-flop operating with differential signal input, differential clock input 264, and providing differential outputs 268 and 269. A programmably adjustable differential signal clock 264 is input to the sampler 265 for sampling the quantized output of the comparator 250. The clock 264 is provided as an output of a clock buffer 270 connected to a clock generator 272, so as to minimize source loading of the clock generator. The clock 264 is preferably buffered by an additional buffer 292 for transfer to one or more other locations of the chip where it can be advantageously used.

A requirement of the measurement circuit 200 is high bandwidth. For this purpose, comparator 250, sampler 265, clock generator 272, clock buffer 270, and differential clock 264 of the primary signal path of measurement circuit 200 have very high bandwidths of desirably four times the bandwidth of the CUT output 234, such that signal measurements are clocked precisely, rather than being spread out over time.

The quantized output 252 of the comparator 250 is also provided to a high-speed buffer amplifier 261, preferably having differential outputs, for driving the buffered output off the chip. For example, the CUT can be operated to provide a static signal output, and that CUT output be then applied as input to comparator 250 for generating a static output 252. The static output 252 can then be driven off the chip by buffer amplifier 261 for verification by external circuitry that the measurement circuit 200 and CUT are operational.

The quantized output 252 of the comparator 250 is also input to a peak detector 288, which is preferably implemented by a set-reset flip-flop. The PEAK OUT signal of peak detector 288 is initialized to "0" by the reset signal input thereto. Thereafter, PEAK OUT is set to "1" by the peak detector 288 at the first instant that the quantized comparator output 252 has a differential voltage representing a "1". The peak detector 288 can be used in a particular test arrangement in which the differential reference voltage 204 input to the comparator 250 is set to a high level at or close to the expected peak level of the CUT signal voltage 234. In such way, the comparator output 252 only enters the "1" state when the input signal voltage 234 exceeds the high reference voltage level 204. The output of the peak detector 288 then changes to "1" and remains at "1" from the time when the CUT signal 234 first exceeds the high reference voltage level 204. By operating the measurement circuit 200 in this manner over given intervals of time, the PEAK OUT signal can be used to determine if the peak level of the CUT signal 234 exceeds that of the reference voltage. By periodically resetting the peak detector 288, changing the level of the reference voltage 204 and repeating the test one or more times at different reference voltage levels, the peak level of the CUT signal 234 can be determined.

A second peak detector 289, also implemented by a set-reset flip-flop, but to which the plus and minus inputs 252 are reversed, can be used in a similar manner to that described above to detect the minimum level of the CUT signal 234. In such case, the reference voltage 204 is set to a level near the expected minimum level of the CUT signal 234, such that the output of the comparator 252 remains high unless the CUT signal 234 falls below the reference voltage level. Since the inputs 252 to the peak detector 289 are reversed, the output of the peak detector 289 becomes "1" (and then remains at "1") only when the comparator outputs 252 indicate "0", i.e., that the CUT signal is below the reference voltage level. In such manner, the minimum level of the CUT signal can be determined.

By inputting a properly ordered sequence of reference voltages to comparator 250 and a properly ordered sequence of clock phases to sampler 265, a sequence of samples of the CUT signal can be obtained, from which the characteristics of the high-speed data transmission signal 234 can be accurately measured. Measurement circuit 200, therefore, functions as a digitizer for measuring time domain characteristics of the high speed output of the CUT, such time domain characteristics including rise-time and fall-time, levels, switching frequency, jitter, and so on.

In a particular alternative embodiment of the invention, a system and method of measuring a signal is implemented with circuitry having single-ended inputs and outputs, rather than differential inputs and outputs, as described above relative to FIG. 1 above. In such alternative embodiment, the comparator 250 has a single-ended output and is connected to operate on a single-ended signal 234 from a CUT, and receive output of a single-ended reference voltage generator 220. In addition, the sampler and clock input to the sampler, as well as other circuit elements, do not have differential inputs but single-ended inputs, instead.

The operation of the embodiment shown in FIG. 1 will now be described with reference to FIG. 2. The differential signal voltage 234 that is input to comparator 250 is illustrated as a difference between the instantaneous levels on each of the pair of differential signal lines 234. The instantaneous levels on the differential signal lines represented by voltage 234 are quantized by comparator 250 relative to the reference voltage level Vref. Thereafter, the quantized signals are sampled by fast transitioning, e.g. fast rise-time clock pulses 212 of clock 264 shown in FIG. 2.

FIG. 2 illustrates the quantizing of the signal 234 input to the comparator 250 in relation to the reference voltage Vref 204, and the sampling of the quantized output 252 of the comparator 250 by the fast transitioning, low duty-cycle clock 264. First, the signal is quantized as shown in the graph COMP OUT 252. The quantized output 252 appears as a train of pulses corresponding to the successive cycles of the signal 234 which is input to the comparator 250. The pulses of the quantized output 252 become broader as viewed from the left side of the graph to the right because the reference voltage 204, with which the input signal 234 is compared, varies from a higher level of 0.8 V, for example, to successively lower levels, e.g. 0.6, 0.4, 0.2 and 0.0 V. Signal 234 remains higher than Vref over longer periods during such intervals when Vref is lower, causing the output 252 of the comparator to remain high longer.

For simplicity and ease of description, the levels of Vref are shown in FIG. 2 as changing frequently, in that they do not remain at a particular level for more than a few cycles of the input signal 234. In actual use, the reference voltage Vref would remain at each level over many cycles of the input signal 234 while the signal 234 is provided as a predetermined test pattern (e.g. steady-state toggling from low to high) of the chip. In such way, many samples are taken of the signal 234 at that steady state over relatively long intervals such that measurements of the time domain characteristics of the CUT signal 234 such as rise-time, fall-time, jitter, etc. can be determined by analysis of the samples, as on an external logic analyzer or tester tool.

The clock 264 provides a train of fast transitioning low duty-cycle pulses 212 for sampling. The clock is provided as a differential signal having two complementary clocks 262 and 263, clock 263 being normally low and having high-going pulses 212 and clock 262 being normally high and having low-going pulses 212 coinciding with the high going pulses 212 of clock 263. The time in which the pulses 212 of the differential clock 264 transition between low and high levels should be at most one quarter of the minimum switching period of the input signal 234 for the highest switching rate which the signal 234 can be expected to be input to comparator 250. The rise-time of clock 263 and the fall-time of the complementary clock 262, therefore, must be at most one quarter of the minimum switching period of the input signal 234.

The Nyquist criterion specifies that a signal must be sampled at or above twice the highest signal frequency in order for complete information about the signal to be obtained. While the low duty cycle of the clock 264 provides for undersampling of a signal that does not meet the Nyquist criterion, when the signal to be sampled is a signal that repeats over many cycles as long or longer than the intervals between transitions of the clock 264, and sampling is performed with a precise clock edge, such undersampling can produce information sufficient to reconstruct the repetitive signal, i.e. identify all of the signal's time-domain characteristics.

Thus, the repetitive input signal 234 is sampled with a fast rise-time, i.e., fast transitioning clock in a way that permits all of its time-domain characteristics to be identified. Ideally, the rise-time of the clock 264 should be even faster than that, such that for an input signal having a switching frequency of 10 GHz, for example, the interval over which each sample by the clock 264 is taken is less than $1/(2 \times 10 \text{ GHz})=50$ pS; hence, a rise-time of one half that figure is needed, i.e., 25 pS, since the clock must both rise and fall over each sampling interval. In planning for future needs, even faster rise-time clocks could be incorporated as part of the on-chip testing circuit 200, as switching rates of the input signal 234 will increase in future products.

As used herein, the rate of sampling is defined as the frequency of occurrence of clock pulses 212, as distinguished from the rise-time and fall-time of the clock pulses themselves, which are at much higher frequency.

An illustrative example of operation will now be provided. The chip, i.e. the CUT, is operated in a predetermined steady state mode such that its output switches between levels in a known pattern. Programming signals are applied to the reference voltage generator 220 such that its output cycles through a test sequence of reference voltages in a predetermined pattern. This is accomplished through manipulation of the LOAD and the LEVEL DATA inputs to the reference voltage generator 220, as by on-chip programming through a built-in-self-test program, or, alternatively, test data scanned in through a tester interface. With the reference voltage Vref at a desirable level, the input signal 234 is quantized, providing the output pulses shown in the graph labeled COMP OUT 252. Thereafter, the quantized output is sampled with the fast rise-time, low duty cycle clock 264 to produce the sampled differential output signals 268 and 269 shown in the graph labeled SAMPLER OUT.

As shown in the graph labeled CLK, the low duty cycle clock 264 is a pair of differential clocks 262 and 263 that simultaneously switch between levels to produce clock pulses 212. At a point in time 280 at which a first clock pulse 212 fires, COMP OUT 252 is lower than the switching threshold of the sampler 265, and therefore, the output 268 transitions to low, while the complementary output 269 transitions to high. Then, several cycles of the input signal 234 later, at the time 281 when the next clock pulse 212 fires, COMP OUT 252 is now above the switching threshold of the sampler 265, and the output signal 268 therefore transitions high, while the complementary signal 269 transitions low. The sampling continues over many cycles of the input signal 234, while the reference voltage is varied over intervals which are long in relation to the period of the input signal 234. Meanwhile, the edge of the clock 264 can be varied such that sampling takes place at different phases during the switching period of the input signal, either while holding the reference voltage Vref steady, or otherwise. For example, the edge of the clock can be varied between several phases over the switching period of the input signal 234.

As shown in the graph labeled SAMPLER OUT in FIG. 2, the output of the sampler 265 is a much lower switching rate signal, as compared to the input signal 234. The high-speed output of the CUT (the input signal 234) switches too fast to be measured by most off-chip tester tools. The signal measurements obtained by sampling as described herein have a switching rate which is slowed down to a level within the bandwidth of most such tools. As a result, the output signal can be analyzed and processed by readily available and cost-competitive tester tools.

Figure 3:
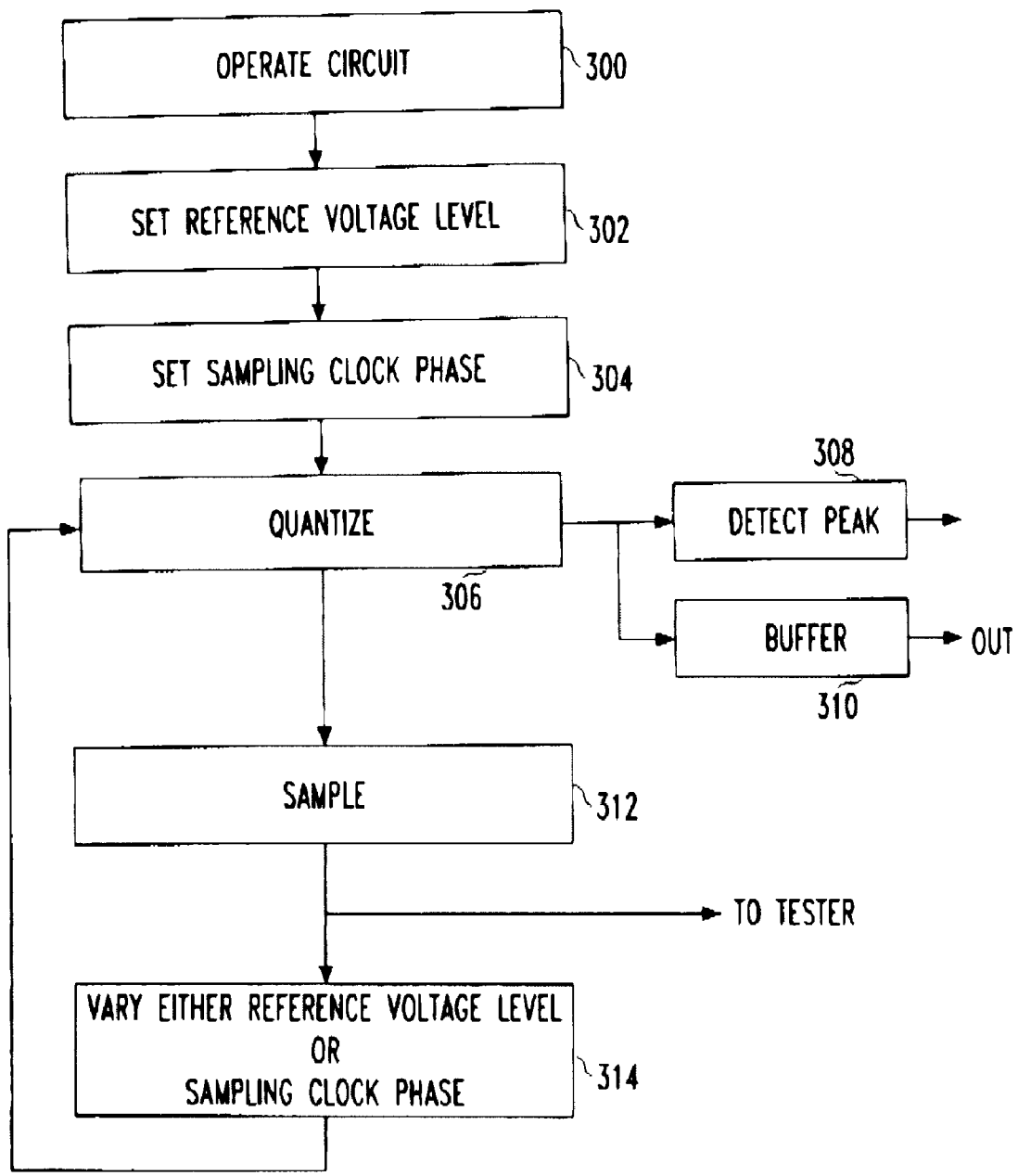
FIG. 3 is a flow diagram further illustrating operation according to the invention.

FIG. 3 illustrates an exemplary test sequence for measuring a high-speed signal by obtaining samples of the signal with a digitizer such as that described in the embodiments herein. As shown in FIG. 3, the test sequence begins by operating (300) the circuit under test (CUT) to generate a predetermined signal such as a steady state toggling between signal levels. Alternatively, the CUT can be operated to produce a slowly varying pseudo-random bit sequence (PRBS) that can be compared to a PRBS generated by an external logic analyzer off the chip, which receives the sample output 268 of the measurement circuit 200. In steps 302, 304, the reference voltage level input to the quantizer and the sampling clock phase are also set at this time to initial values by programmed control input to measurement circuit 200.

The input signal is then quantized (306) by the comparator in accordance with the reference level provided thereto. In addition, setting the differential reference voltage that is input to the comparator to an appropriately high level at or close to the expected level of the input signal from the CUT, the peak level of the input signal can be detected (308) from the quantized output of the comparator. The quantized signal can also be buffered (310) for output to external circuitry for verifying operation of the measurement circuit including the comparator and reference voltage generator.

The quantized signal is now sampled (312) and the sampled output thereof provided to an external tester through an interface of a production fixture. The quantizing (306) and sampling (312) continue over many cycles of the input signal so as to obtain results that can be analyzed with precision to determine signal characteristics such as rise-time, fall-time, jitter, etc. For example, if the reference voltage level is currently set to zero, the samples obtained may now indicate zero crossings of the input signal.

Thereafter, either the reference voltage level or the sampling clock phase is varied (314), and operation of the measurement circuit continues, such that sampling is now conducted by quantizing with a different reference voltage level or a different sampling clock phase. The samples obtained may now indicate when the input signal crosses a different voltage threshold than before, for example, when the input signal transitions fully to the high level. This process of changing at least one of the reference voltage level and sampling clock phase and then sampling the input signal with the new settings is performed iteratively many times until much information is gathered about the characteristics of the input signal, for example, its rise-time, fall-time, jitter, etc. In such manner, samples are obtained which measure the high-speed CUT signal input to the measurement circuit 200 in a way that can be further analyzed by an off-chip logic analyzer.

For example, a particular programmed sequence of reference voltage levels and phases of the sampling clock can be used to test the rise-time of the CUT signal 234. Typically, the reference voltage level 204 will be set to an initial value, e.g. at a level somewhat above the nominal low level $V_{Low}$ and below the nominal high level $V_{High}$ of the CUT signal. Sampling is then performed with the edge of the sampling clock 264 set to an initial phase at an expected beginning of the signal transition. If the signal has risen above the initial reference voltage value when sampled by the clock edge, a "1" will result in the output, otherwise, a "0" results.

However, more testing is needed to determine the rise-time. Without yet varying the reference voltage level, the edge of the sampling clock 264 is delayed incrementally in phase, and sampling is continued to determine if the CUT signal exceeds the reference voltage when sampled at the later phase. Sampling is continued at the same reference voltage, with the edge of the sampling clock delayed incrementally each time until a pattern of samples is obtained which indicates the timing when the CUT signal exceeds the initial reference voltage value. From these samples it can be determined when the CUT signal surpasses an intermediate voltage while transitioning from $V_{Low}$ to $V_{High}$.

Thereafter, the reference voltage is then set to a new level, incrementally higher than the initial level, and the process of sampling the CUT signal at different phases is then repeated, to obtain measurements of when the CUT signal exceeds the newly set reference voltage. By repeating these steps of incrementally increasing the reference voltage level up to $V_{High}$ and sampling with a set of incrementally varied clock phases, the rise-time of the CUT signal can be accurately determined.

The fall-time of the CUT signal can be measured in a similar manner by incrementally varying reference voltage levels and varying the phase of the clock edge in relation to the falling transition of the CUT signal. Other possible measurements which can be performed using test sequences similar to that described above for the rise-time include but are not limited to the measurement of signal eye width characteristics, such as eye-width and eye height.

While the invention has been described in accordance with certain preferred embodiments thereof, those skilled in the art will understand the many modifications and enhancements which can be made thereto without departing from the true scope and spirit of the invention, which is limited only by the claims appended below.

The invention claimed is:

1. A method of measuring an output of a high-speed data transmission circuit, comprising:
   operating the high-speed data transmission circuit;
   quantizing an output of the circuit relative to a variable reference voltage;
   sampling said quantized output with a clock having a transitioning time which is less than one quarter of a minimum switching period of the output of the circuit; and
   varying said variable reference voltage during said quantizing and varying said clock during said sampling to obtain a plurality of samples which measure the output of the circuit.

2. The method of claim 1 wherein said variable reference voltage is varied during said quantizing between a plurality of levels between a minimum level and a peak level of the output of the circuit.

3. The method of claim 2 wherein an edge of said clock is varied during said sampling between a plurality of phases of a signal period of the output of the circuit.

4. The method of claim 3 wherein said clock samples said quantized output at a rate which is slower than a maximum switching rate of the output of the circuit.

5. The method of claim 4 wherein said sampling rate is at least twice as slow as said maximum switching rate of the circuit.

6. The method of claim 2 further comprising detecting a peak level of the output of the circuit.

7. The method of claim 2 wherein said variable reference voltage is varied linearly between said minimum level and said peak level.

8. The method of claim 1 wherein said quantized output is buffered for output to an external tester.

9. The method of claim 1 wherein all said steps of quantizing the output of the circuit, sampling said quantized output, and varying said reference voltage and said phase of said sampling clock are performed on the same chip on which said high-speed data transmission circuit is located.

10. A method of measuring an output of a high-speed data transmission circuit, comprising:
    operating the high-speed data transmission circuit;
    quantizing an output of the circuit relative to a variable reference voltage;
    sampling said quantized output with a clock having a transitioning time which is less than one quarter of a minimum switching rate of said output of the circuit; and varying said variable reference voltage during said quantizing between a plurality of levels between a minimum level and a peak level of the output of the circuit, and
    varying said clock during said sampling between a plurality of phases to obtain a plurality of samples which measure the output of the circuit.

11. An apparatus for measuring an output of a high-speed data transmission circuit, comprising:
    a programmable reference voltage generator operable to generate a reference voltage that is variable between a plurality of levels;
    a quantizer operable to quantize an output of the high-speed data transmission circuit relative to a level of said plurality of reference voltage levels;
    a clock generator operable to generate a clock having a transitioning time which is less than one quarter of a minimum switching period of the output of the circuit; and
    a sampler operable to sample said quantized output with said clock to produce a plurality of samples which measure the output of the circuit.

12. The apparatus of claim 11 wherein said clock generator is further operable to shift an edge of said clock between a plurality of phases such that said quantized output may be sampled at each of said plurality of phases of said clock edge.

13. The apparatus of claim 11 wherein said clock generator is operable to generate said clock at a rate slower than a maximum switching rate of the output of the circuit.

14. The apparatus of claim 13 wherein said rate of said clock is at least twice as slow as said maximum switching rate of the output of the circuit.

15. The apparatus of claim 11 further comprising a set-reset flip-flop coupled to said quantized output, wherein said set-reset flip-flop is operable to detect a peak level of the output of the circuit when said reference voltage is set to a level close to an expected peak level of the output of the circuit.

16. The apparatus of claim 11 wherein said reference voltage generator is operable to linearly vary said reference voltage between said plurality of levels.

17. The apparatus of claim 11 further comprising a buffer amplifier operable to buffer said quantized output for output to an external tester.

18. The apparatus of claim 11 further comprising a first buffer operable to regenerate the output of the circuit at an input to said quantizer.

19. The apparatus of claim 18 further comprising a second buffer operable to regenerate said reference voltage level at an input to said quantizer.

* * * * *